July 25, 1950  J. DE LANNE  2,516,506
TRAILER HITCH
Filed Jan. 2, 1946

INVENTOR.
JACQUE DE LANNE
BY Charles S. Evans
his attorney

Patented July 25, 1950

2,516,506

UNITED STATES PATENT OFFICE 2,516,506

TRAILER HITCH

Jacque De Lanne, San Francisco, Calif.

Application January 2, 1946, Serial No. 638,631

3 Claims. (Cl. 280—33.17)

My invention relates to couplings between vehicles and among the objects of the invention is the provision of a trailer hitch giving universal movement between the parts and characterized by simplicity and rugged strength.

Figure 1:
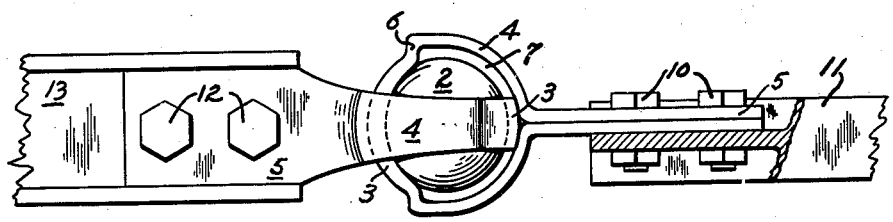
Figure 2:
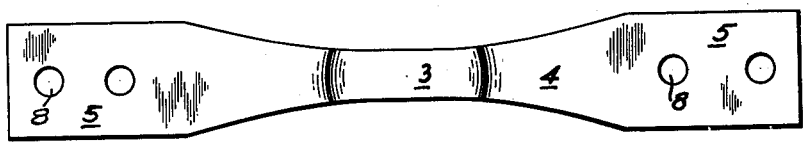
Figure 3:
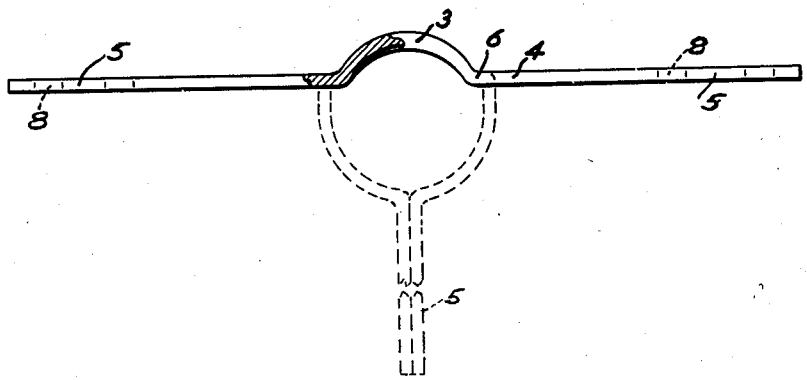

Referring to the drawings: Figure 1 is a side elevation of my trailer hitch mounted to couple the tongue of a trailer to a frame member of the towing vehicle. Only the ends of the tongue and frame member are shown. Figure 2 is a plan view of one of the twin parts after it has been partially shaped by dies from flat stock. Figure 3 is a side elevation of the part shown in Figure 2, the final form to which the part is bent being indicated in dotted lines.

In terms of broad inclusion the trailer hitch of my invention comprises three pieces, a steel ball, and twin socket loops disposed about the ball at right angles to each other and provided with bolt holes in their oppositely extending ends for securing the hitch to the coupled vehicles.

The steel ball 2 may be of any convenient size and preferably is tempered and ground. Each of the two like loops or straps required is stamped from strip or plate stock and has the shape indicated in the drawings. It comprises a central spherical segment 3 of the same inside diameter as the ball, and on each side of which widening wing portions 4 extend to mounting plates 5. The spherical segment is relatively narrow as shown in Figure 2, but is long enough, as shown in Figure 1, to extend around about one-third of the circumference of the ball.

Immediately next to each end of the spherical segment, the wing portion is bent sharply outwardly to provide an offset 6, and then curved around concentric with the ball as shown in Figure 1, but spaced from its surface, so that between the ball and each pair of wing or clearance portions 4, a space 7 is left in which the spherical segment of the other piece may move freely.

The shaping and bending is done in a conventional manner by the use of conventional dies, tools and jigs; and these need not be explained here further than to say that the twin pieces shaped as shown in Figure 2 are assembled on opposite sides of the ball and then each is bent to bring the mounting plates 5 flat together as shown in Figure 1 with the bolt holes 8 in alignment.

Bolts 10 through the end of the trailer tongue 11; and bolts 12 through the member 13 fixed to the frame of the towing vehicle, couple the vehicles together securely while permitting universal movement about the ball as well as the necessary degree of relative twisting movement on the longitudinal axis through the coupling.

I claim:

1. A hitch for connecting a trailer to a towing vehicle, comprising in combination: a ball, a pair of twin loop members each encircling the ball, each loop member extending within the other loop member and disposed to confine the ball therebetween, means whereby one of the loop members may be secured to a trailer and the other to a towing vehicle, each loop member having a curved socket portion with an inner radius conforming to the surface of the ball and also having offset portions at each end of the socket portions extending away from the ball, each loop member having curved wing portions of larger inner radius extending from said offset portions concentric with the ball but defining clearance with respect to said ball for reception of the socket portion of the other loop member, the inner surface of each wing portion providing a bearing for the outer surface of the socket portion of the other loop member.

2. A hitch for connecting a trailer to a towing vehicle, comprising in combination: a ball, a pair of twin loop members each encircling the ball, each loop member extending within the loop member and disposed to confine the ball therebetween, means whereby one of the loop members may be secured to a trailer and the other to a towing vehicle, each loop member having a curved socket portion conforming to the ball surface and curved clearance portions of larger inner radius disposed on each side thereof, each loop member having lateral offsets joining the socket portion and clearance portions, the inner surface of the clearance portions providing a bearing for the outer surface of the socket portion of the other loop member.

3. A trailer hitch for connecting a trailer to a towing vehicle, comprising in combination: a ball, a pair of tension straps each looped to encircle the ball and to pass within each other, means whereby both ends of one of the straps may be secured as a unit to a trailer, means whereby both ends of the other strap may be secured as a unit to a towing vehicle, each of the tension straps having a curved socket portion conforming to the ball surface and curved clearance portions of larger inner radius disposed on each side thereof, the inner surface of the clearance portions providing a bearing for the outer surface of the socket portion of the other tension strap.

JACQUE DE LANNE.

REFERENCES CITED

The following references are of record in the file of this patent:

UNITED STATES PATENTS

| Number | Name | Date |
|---|---|---|
| 1,407,873 | Buller | Dec. 27, 1921 |
| 1,431,208 | Austin | Oct. 10, 1922 |
| 2,113,441 | Curtis et al. | Apr. 5, 1938 |